(12) United States Patent
Wlodarczyk et al.

(10) Patent No.: US 7,340,118 B2
(45) Date of Patent: Mar. 4, 2008

(54) FUEL INJECTORS WITH INTEGRAL FIBER OPTIC PRESSURE SENSORS AND ASSOCIATED COMPENSATION AND STATUS MONITORING DEVICES

(76) Inventors: Marek T. Wlodarczyk, 6865 Vachon Dr., Bloomfield Hills, MI (US) 48301; Thomas J. Poorman, 1616 N. Hacker Rd., Howell, MI (US) 48843

( * ) Notice: Subject to any disclaimer, the term of this patent is extended or adjusted under 35 U.S.C. 154(b) by 406 days.

(21) Appl. No.: 10/668,056

(22) Filed: Sep. 22, 2003

(65) Prior Publication Data
US 2006/0170909 A1    Aug. 3, 2006

(51) Int. Cl.
G02B 6/00 (2006.01)
G01J 1/42 (2006.01)
G01J 1/04 (2006.01)

(52) U.S. Cl. .............................. 385/12; 385/13; 385/31; 385/4; 385/5; 356/225; 356/218; 356/601; 250/227.11

(58) Field of Classification Search ................ 385/12, 385/13, 31, 45, 4, 5; 73/119 A, 119 R, 116, 73/705, 715, 718, 721; 250/227.21, 231.19 250/227.11; 356/225, 601, 218
See application file for complete search history.

(56) References Cited

U.S. PATENT DOCUMENTS

| | | | |
|---|---|---|---|
| 4,392,712 A * | 7/1983 | Ozeki ........................... 385/43 |
| 4,487,206 A * | 12/1984 | Aagard ........................ 600/480 |
| 4,588,886 A * | 5/1986 | Snider .................... 250/227.21 |
| 5,013,150 A * | 5/1991 | Watts et al. ................... 356/73 |
| 5,200,610 A * | 4/1993 | Zuckerwar et al. .... 250/227.21 |
| 5,452,087 A * | 9/1995 | Taylor et al. ................ 356/480 |
| 5,600,125 A * | 2/1997 | Poorman et al. ............ 250/205 |
| 5,657,405 A * | 8/1997 | Fujiwara ...................... 385/12 |
| 5,693,936 A * | 12/1997 | Komachiya et al. ... 250/227.17 |
| 5,771,091 A * | 6/1998 | Paritsky et al. ............ 356/4.01 |
| 6,131,465 A * | 10/2000 | Wlodarczyk et al. ......... 73/715 |
| 6,622,549 B1 * | 9/2003 | Wlodarczyk et al. ..... 73/119 A |
| 6,966,217 B1 * | 11/2005 | Wlodarczyk ................. 73/115 |
| 2006/0170909 A1 * | 8/2006 | Wlodarczyk et al. ........ 356/225 |

* cited by examiner

Primary Examiner—Brian M. Healy
(74) Attorney, Agent, or Firm—Barbara M. Burns

(57) ABSTRACT

Fuel injectors (10) for internal combustion engines are modified and equipped with fiber optic fuel pressure sensors (12) and fiber optic combustion pressure sensors (14). The combustion pressure sensors (14) are located in separate channels (26) formed in the fuel injectors with the lower portion (22) of the channels leading to the combustion chambers. Above the combustion pressure sensors (14) are fiber optic leads (24). In the preferred embodiments the sensors (46) are equipped with diaphragms (40) of novel shape (48) and employ multiple pairs of fibers (86, 88), temperature sensitive components (72, 74, 126) and novel compensation and status monitoring circuits (FIGS. 6, 9, 10, 14, 15, 18).

28 Claims, 8 Drawing Sheets

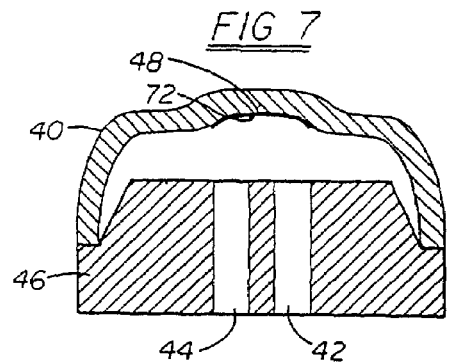
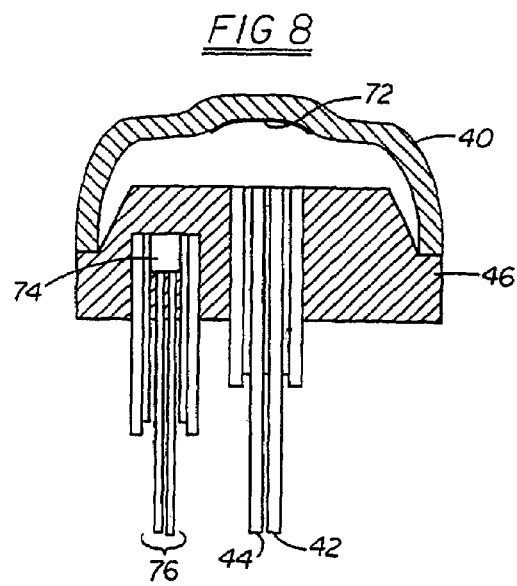
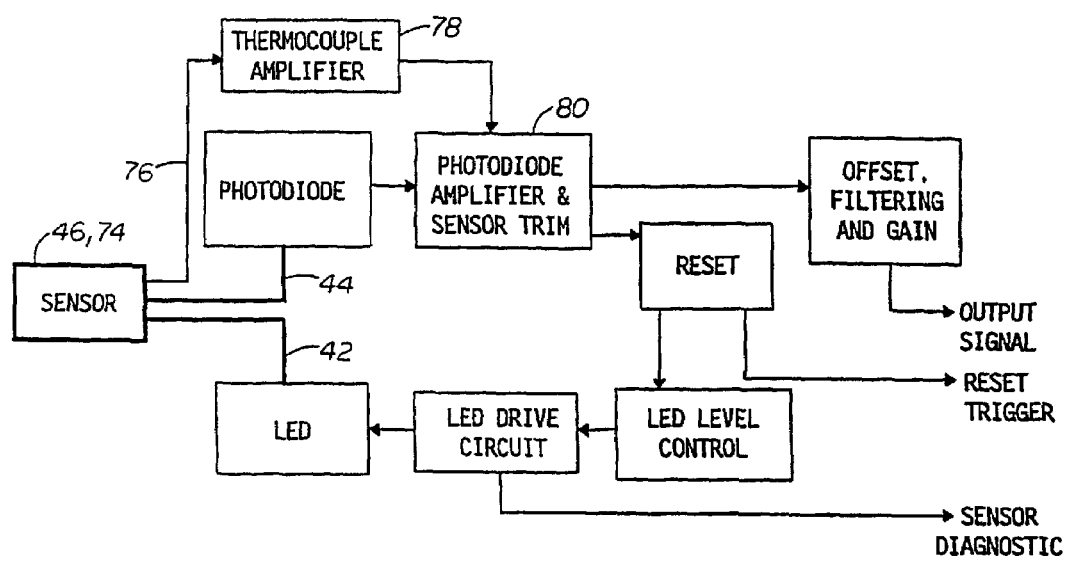

FUEL INJECTORS WITH INTEGRAL FIBER OPTIC PRESSURE SENSORS AND ASSOCIATED COMPENSATION AND STATUS MONITORING DEVICES

BACKGROUND OF THE INVENTION

This application incorporates by reference application Ser. No. 08/442,218, now U.S. Pat. No. 5,600,125, by the same inventors entitled Compensation and Status Monitoring Devices for Fiber Optic Intensity Modulated Sensors.

Four stroke direct-injection engines have been under recent intense development for both diesel and gasoline fuel applications due to significant fuel economy improvements and reduced emission levels in comparison to engines with conventional fuel injection. Direct injection diesel engines have a higher baseline thermal efficiency (about 40% peak), 20-35% better fuel efficiency, 10-20% lower $CO_2$ emissions, near-zero evaporative emissions, and low cold-start emissions. Fuel economy improvements of as much as 35% have been recently reported, combined with a simultaneous increase in engine power and torque of 10%, for a direct gasoline injection engine. Such remarkable performance has been realized through a combination of very lean burn combustion (Air-fuel ratios as high as 40:1) and stratified charge mixing inside each engine combustion chamber.

SUMMARY OF THE INVENTION

A key component that is required for both Direct Diesel Injected (DDI) and Direct Gasoline Injected (DGI) engines is an accurate and cost-effective fuel injector. In diesel engines, the new injection must operate at extremely high pressures (as high as 30,000 psi), provide accurate and repeatable spray patterns, and be precisely timed. In addition, such an injector must operate for as many as 0.5 million miles and be of low cost.

In DGI applications, in particular, the very poor lubricating nature of gasoline and critical injector specifications make gasoline injectors difficult and expensive to manufacture.

To provide the required performance, reliability, and low-cost for both DDI and DGI injectors, disclosed below are approaches based on closed loop control of injector operating parameters, where combustion chamber and fuel pressures are used as control parameters. As detailed below a preferred way of obtaining these two pressures is to integrate two miniature fiber optic pressure sensors inside an injector. Such a "smart" injector does not need to be individually calibrated, as currently done, so its price can be significantly lower. Differences caused by manufacturing variability, aging, pressure line fluctuations, or fuel quality can be compensated for by using closed-loop control of fuel injection timing, duration and pressure. The combustion chamber pressure sensor of the smart injector provides, in addition, real-time information about cylinder pressure including peak pressure (PP), indicated mean effective pressure (IMEP), start of combustion (SOC) and location of peak pressure (LPP). When inputs from both fuel and combustion pressure sensors are used to control the injector, simultaneous benefits of reduced emissions, improved fuel economy, increased injector reliability, and reduced cost can be achieved.

Invention Overview

The fiber optic sensors utilized in the smart injector are of a novel construction aimed at high accuracy in a very small device exposed to extremely high pressures and temperatures. The sensor tip may be as small as 2.5 mm in diameter or smaller. By using a specially shaped diaphragm in the sensor and two D-shaped optical fibers, high levels of optical modulation can be realized at small diaphragm deflections. Small diaphragm deflections are required to permit high diaphragm yield strength and long fatigue life. Using a two photodiode detection technique, each sensor's signal interface/conditioner can operate accurately over a temperature range of −50 to 150° C.

In a preferred configuration two types of sensors are used in the smart injector: (1) a high pressure sensor for monitoring static fuel pressures inside the injector and (2) a sensor for detecting dynamic combustion chamber pressures.

To compensate for changing sensor response with temperature, a temperature compensation technique utilizes a combination of a thin film deposited on the diaphragm inner surface and a temperature probe mounted in the sensor housing. The thin film reflection coefficient changes with temperature thereby compensating for any intra cycle (short term) diaphragm temperature excursions above its average temperature. Any longer term errors, resulting from increased diaphragm deflection at higher average temperature and other thermal effects on the sensor head, are compensated for by adjusting the pressure sensor's gain, based on the temperature probe output.

While most direct injectors require dynamic fuel pressure information, only static pressures must be known in such approaches as fuel rails. Disclosed below is a static pressure sensor utilizing two optical fiber pairs, with one pair acting as a reference device to compensate for errors that may result from temperature effects on opto-electronic components, fiber bending, or other sources of undesirable light intensity fluctuations.

As above, to compensate for errors arising from intra-cycle diaphragm heating due to the nearby combustion gasses, the compensation technique is similar to the technique used for dynamic sensors. For the static sensor one pair of fibers is exposed to diaphragm deflection and the other pair of fibers is installed in front of a non-deflecting reflector coated with a reflection temperature dependent thin film. A separate temperature probe provides input information for additional compensation for sensor gain and offset changes arising from varying inter-cycle average diaphragm and housing temperatures.

BRIEF DESCRIPTION OF THE DRAWINGS

FIG. 7 is a schematic cross-section of a preferred sensor tip including a temperature dependent reflective thin film;

FIG. 8 is a schematic cross-section of the preferred sensor tip of FIG. 7 further including a temperature probe;

FIG. 9 is a block diagram of the opto-electronic circuitry for the sensor tip of FIG. 8 in a dynamic pressure setting;

DESCRIPTION OF THE PREFERRED EMBODIMENTS

Figure 1:
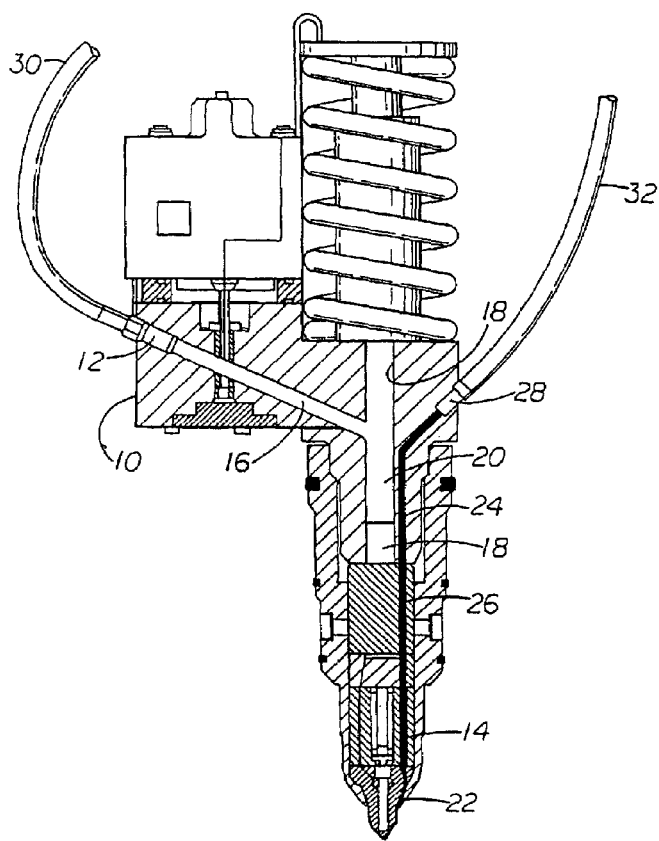
FIG. 1 is a schematic cross-section view of a smart injector with both fuel pressure and combustion pressure sensors.

In FIG. 1 the modified smart injector 10 is fitted with both a fuel pressure sensor 12 and a combustion pressure sensor 14. The fuel sensor 12 may be mounted in a modified existing injector opening 16 as shown. The opening 16 comprises a channel communicating with the axial fuel channel 18 of the injector 10. The sensor 12 may be approximately 5 mm in diameter and threaded into the channel 16 whereby the sensor diaphragm is directly exposed to the fuel pressure in the channel and also the axial fuel channel 18 when the injector plunger 20 is retracted.

The combustion pressure sensor 14 is exposed to combustion chamber gases through a short channel 22. The fiber optic lead 24 for this sensor 14 is located inside a 1 mm diameter cylindrical hole 26 extending from the sensor 14 to the strain relief 28 attached to the injector 10 near the top of the injector.

Each of the sensors is connected to its own opto-electronic module or connector as further discussed below. The connections are by the fiber optic cables 30 and 32. The opto-electronic modules contain circuitry which in turn is connected to the engine Electronic Control Module (ECM). The ECM controls the injector timing, duration, and fuel line pressure in response to the output of the sensors 12 and 14 as well as other engine sensors and controls.

Figure 2:
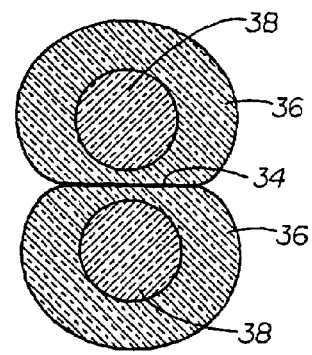
FIG. 2 is a schematic cross-section of a preferred fiber pair.

The preferred sensor design for the fuel and combustion pressure sensors above utilizes two or more optical fibers. These fibers are modified as illustrated in FIG. 2. Rather than using fibers with circular cross-sections, as is conventionally done in fiber optic pressure sensors for other purposes, the fibers are generally D-shaped on the outer surface as shown at 34 where the cladding 36 is substantially reduced in thickness. The multimode fibers are coupled by their flat surfaces 34 to minimize the distance between fiber cores 38.

The minimum distance between fiber cores 38 is highly desired for reduced sensor power loss and increased optical modulation, both resulting in improved sensor resolution, signal to noise ratio and output accuracy. In a typical configuration the fibers have core 38 diameters of 140 microns, cladding 36 of 170 microns and flat surfaces 34 separated from the cores by 5-10 microns. For ease of sensor assembly and repeatability, the fibers are semi-permanently bonded together during the fiber manufacturing process by a thin layer of polyamide or other temperature-capable bonding adhesive material.

Figure 3:
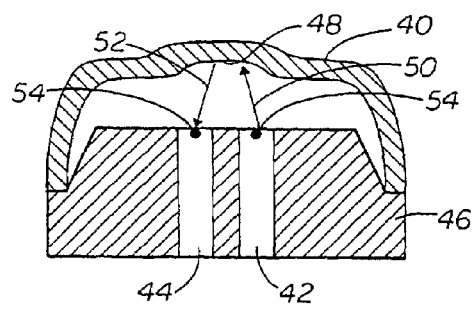
FIG. 3 is a schematic cross-section of a preferred sensor tip.

In FIG. 3 a specially shaped diaphragm 40 sensor tip is shown. The diaphragm 40 is sculptured and is a further improvement on the hat shaped diaphragm first disclosed in application Ser. No. 08/390,970, now U.S. Pat. No. 5,600,070 incorporated herein by reference. The sculptured shape of the diaphragm 40 provides for increased light coupling between the delivering 42 and collecting 44 optical fibers mounted in the sensor body 46. The result is increased sensor sensitivity to diaphragm 40 deflection. As shown in FIG. 3 the inner diaphragm surface 48 is concave at the center of the diaphragm 40 to focus light emitted from the delivering fiber 42 as indicated by arrow 50 onto the collecting fiber 44 as indicated by arrow 52. By design the focus is best when there is no additional external pressure applied to the outside of the diaphragm 40.

Figure 4:
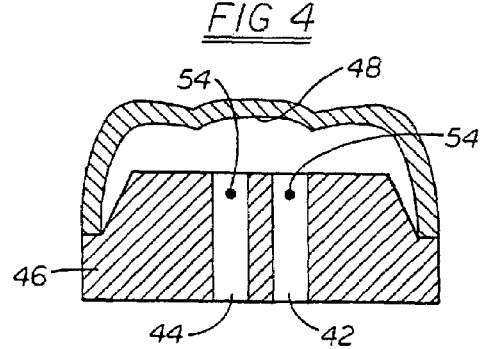
FIG. 4 is a schematic cross-section of the sensor tip of FIG. 3 under increased pressure.

Under optimized conditions, the curvature of the reflecting surface 48 is ellipsoidal to focus the light from the delivering fiber 42 onto the collecting fiber 44 with no external pressure applied. With the application of external pressure, the diaphragm 40 deflects and the ends of the delivering 42 and collecting 44 fibers are no longer at the foci 54 of the ellipsoidal curved reflecting surface 48 as shown in FIG. 4. As a result the collected light is diminished. The diaphragm 40 thickness is substantially retained by curving the outside thereof to generally match the inner curvature and thereby substantially maintain the diaphragm yield strength over the entire diaphragm.

Figure 5:
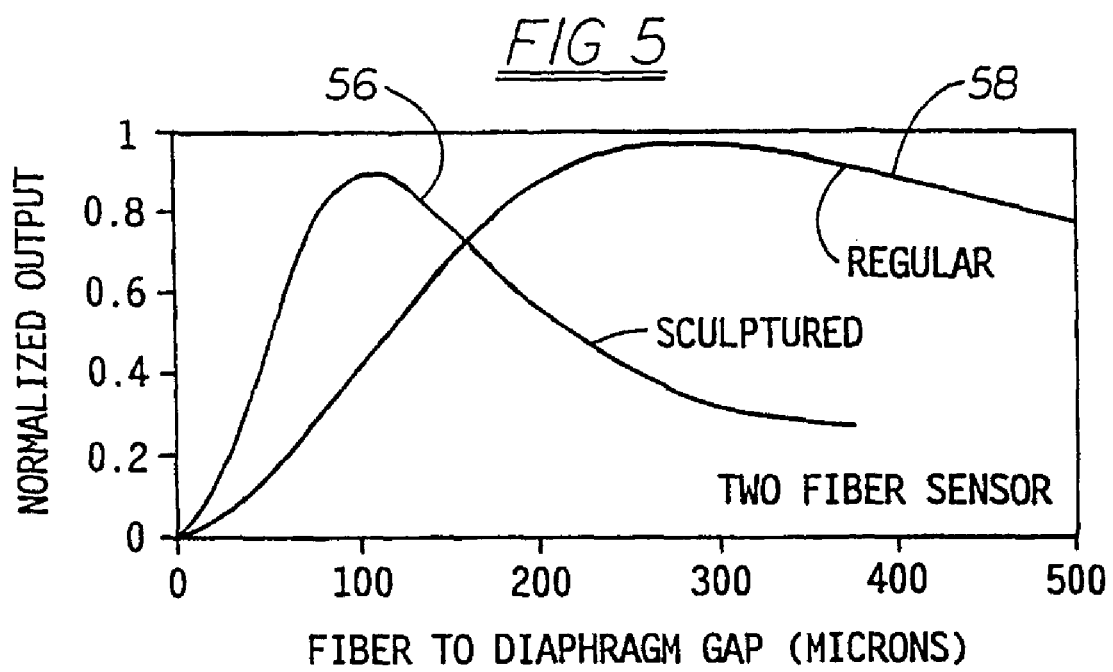
FIG. 5 is a graphical comparison of the responses of the preferred sensor tip to a conventional flat diaphragm sensor tip.

The ellipsoidal curvature surface 48 and foci 54 locations are optimized for a given fiber size, core separation, and optical fiber numerical aperture. Although the ellipsoidal shape is optimum, more practical to manufacture parabolic or spherical surfaces for surface 48 may be substituted. FIG. 5 compares the response 56 of the sculptured diaphragm 40 to the response 58 of a substantially flat or regular diaphragm. Clearly the sculptured diaphragm sensor is significantly more sensitive to external pressure changes than a conventional flat diaphragm sensor.

Figure 6:
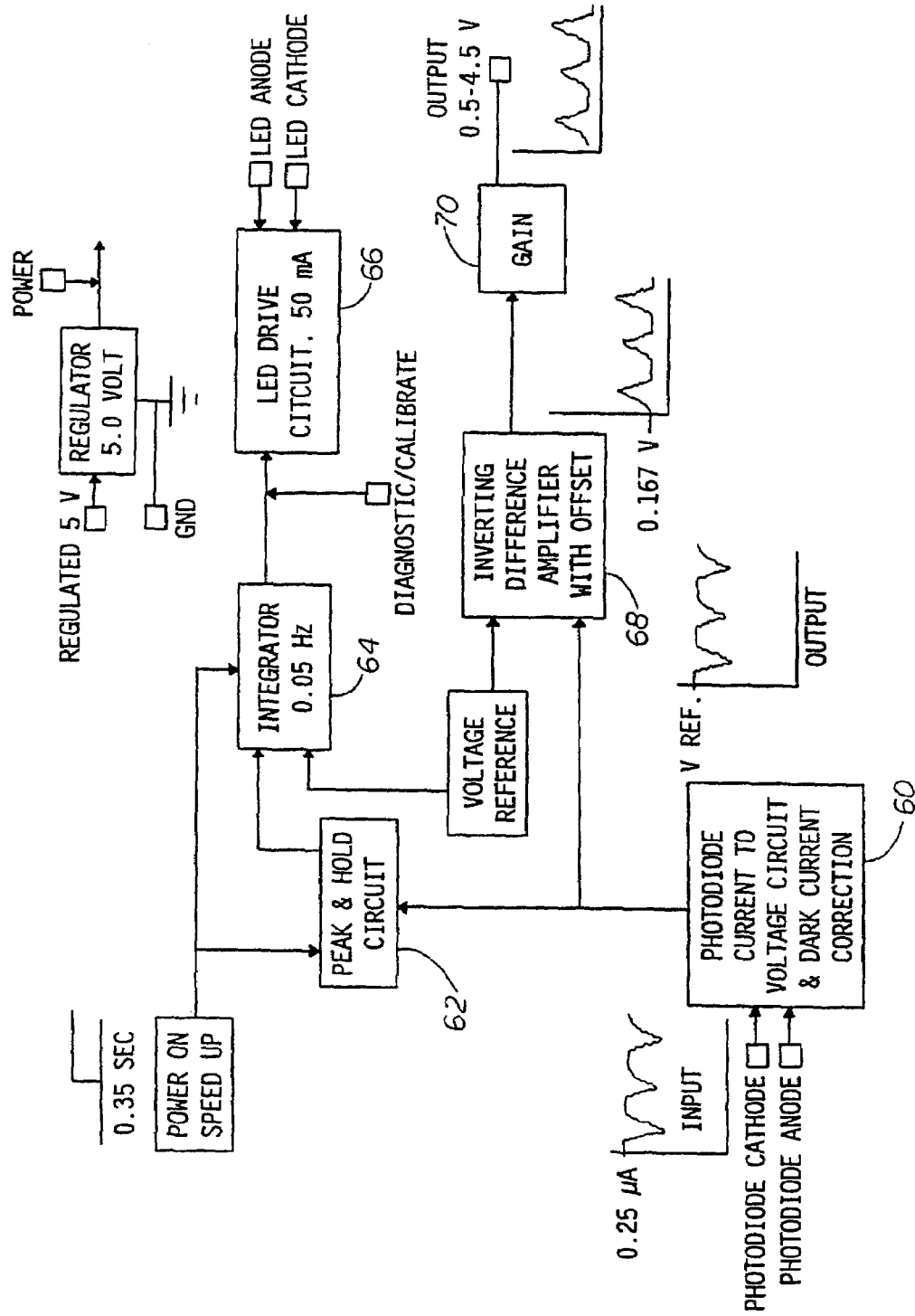
FIG. 6 is a block diagram of the opto-electronic circuitry for a dynamic pressure sensor.

Another aspect of the present invention comprises a novel design of the sensor electronic and opto-electronic circuitry for a dynamic pressure sensor, as shown in FIG. 6. The circuitry permits an increase in the operating temperature of the sensor and interface conditions module of up to a 150° C. working temperature.

The new design uses one LED source and two photodiode detectors in contrast to previous single detector designs. A single detector design is adequate for a maximum electronics operating temperature of approximately 80° C., however, at a maximum operating temperature of 150° C. the dark current of a PIN photodiode becomes so large as to dominate the total photodiode output.

At temperatures up to 80° C., the dark current of a typical photodiode is on the order of 1% of the total signal with 99% of the signal being proportional to the light delivered to the detector by the collecting fiber. But at 150° C. the dark current increases more than three orders of magnitude and may represent as much as 500% of the photodiode signal that remains proportional to the light delivered to the detector. At such high levels of dark current the sensor calibration is significantly compromised.

To combat the dark current effect, the second photodiode is used for the purpose of providing a differentiating dark current input to a differential amplifier. In a preferred design disclosed below, the second diode is packaged inside a common enclosure with both photodiodes formed from the same silicon wafer, so their dark currents change identically with temperature changes. One photodiode is exposed to the light delivered by the collecting fiber while the second diode is covered so its output is only due to the dark current.

In FIG. 6 the current outputs from the photodiodes, one of which is the dark current correction, are combined at 60 to correct for the dark current output of the sensor. The voltage output therefrom is applied through the peak and hold circuit 62 and integrator 64 to the LED drive circuit 66 to thereby adjust the photonic output of the LED to the sensor. The voltage output is also passed through an inverting difference amplifier 68 and gain amplifier 70 to provide a suitable voltage range of output to the ECM of the engine.

One of the most difficult challenges in developing accurate combustion pressure sensors is the need to overcome the effect of temperature changes on the sensor's diaphragm. Under changing temperature, the diaphragm's Young's modulus and Poison's number change resulting in increased deflection at elevated temperatures. Two types of temperature errors result: increased deflection due to increased average diaphragm temperature over many cylinder pressure cycles and the intra-cycle diaphragm temperature excursions. Disclosed below are compensation techniques that correct for both of the temperature change errors.

The short term, intra-cycle, error due to what is sometimes called thermal shock effect is compensated by virtually instantaneously reducing diaphragm reflectivity as the diaphragm temperature changes. In FIG. 7 a thin film 72 with a temperature-dependent co-efficient of reflectivity is deposited on the ellipsoidal surface 48 of the diaphragm 40 to cover the area illuminated by the delivery fiber 42.

The thin film 72 material is appropriately selected for a decreasing reflection co-efficient as the diaphragm deflection rate increases with temperature increases. The light intensity received by the collecting fiber 44 can be described by $$V_{col}(p,T) = I \cdot C \cdot R(T) \cdot D(p,T),$$

where I is light intensity emerging from the delivering fiber 42, C is the collection efficiency dependent on fiber parameters and fiber to diaphragm distance but not dependent on diaphragm characteristics, R(T) is the reflection coefficient of the diaphragm, and D(p,T) is the function describing diaphragm deflection as a function of pressure and temperature.

Through either thin film 72 light transmission or absorption dependence on temperature, the product of the reflection co-efficient R and deflection function D can be maintained independent of temperature if:

$$R(T) = D^{-1}(T)$$

In practice, R(T) may not be exactly an inverse of D but at least should approximate the inverse function.

At least two types of thin films 72 are suitable for temperature compensation as described above. In one type, a dielectric thin film with dichroic mirror-like characteristics is used. In this type reflection decreases with increased temperature due to the thermal expansion of the thin film material. In the alternative type, a semiconductor material such as Silicon or Gallium Arsenide is used. In this type the absorption co-efficient increases with increasing temperature. In either type of thin film 72 the film is deposited over the area illuminated by the delivering fiber 42, however, to minimize internal stresses in the film, the film area should be as small as possible as should the film thickness.

The temperature compensation technique described above does not correct for increased diaphragm deflection resulting from an increased average temperature of the diaphragm-sensor assembly over many pressure cycles. To correct for this type of error a compensation technique which relies on the electronic control of sensor gain is based on the output of a temperature probe mounted inside the sensor housing as shown schematically in FIG. 8. A temperature probe 74, such as a thermocouple, is mounted inside the sensor assembly in the sensor body 46 preferably as close as possible to the sensor diaphragm 40. A pair of wires 76 lead from the thermocouple 74 along side the optical fibers 42 and 44.

A schematic block diagram of the temperature-compensating opto-electronic circuitry for the sensor of FIG. 8 is shown in FIG. 9. Compared to the circuitry of a temperature uncompensated sensor, a thermocouple amplifier 78 receives input from the thermocouple 74 and outputs to the photodiode amplifier 80 to adjust the gain value of the photodiode amplifier. This is in contrast to a fixed gain photodiode amplifier used for an uncompensated sensor. The calibration coefficients relating the sensor-gain to temperature change are obtained during an initial calibration and are uniquely assigned to each sensor when it is calibrated.

A number of innovative designs for a high accuracy static pressure sensor suitable for fuel pressure detection in a smart injector are disclosed below. The first design utilizes a two-fiber construction similar to what is shown in FIG. 3. The processing electronics differentiate between the dynamic and static sensors.

Figure 10:
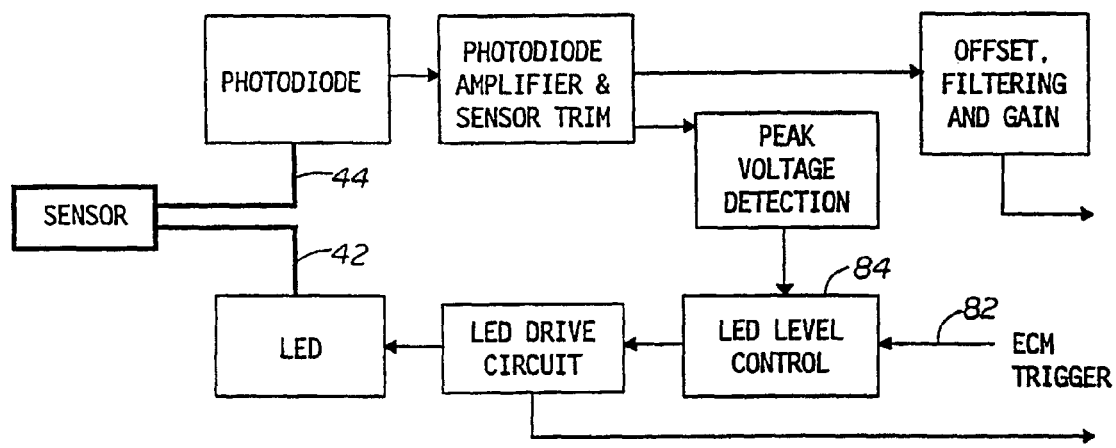
FIG. 10 is a block diagram of the opto-electronic circuitry for the sensor tip of FIG. 8 in a static pressure setting.

The difference between the sensor electronics is in the LED current control. While in a dynamic pressure sensor version the current is continuously adjusted based on the differential output of a minimum-maximum detector, in the static pressure sensor version the current is adjusted only during discrete periods of time when the injector is filled with fuel and the sensor is only exposed to atmospheric pressure. Suitable electronic circuitry is shown in FIG. 10, wherein when the LED current is adjusted the nominal light intensity is restored and any potential offset and gain drifts of the sensor are corrected. The timing trigger 82 for the current reset is provided by the engine ECM to the LED level control at 84.

The second design of a static sensor uses three or four optic fibers, two detectors and one LED. One pair of optic fibers is used to detect diaphragm deflection as above and the other pair serves as a compensation device to correct for potential errors due to fiber bending, coupling efficiency changes between the LED and fibers, the temperature dependence of LED intensity or photodiode sensitivity, as well as diaphragm deflection temperature dependence.

Figure 11:
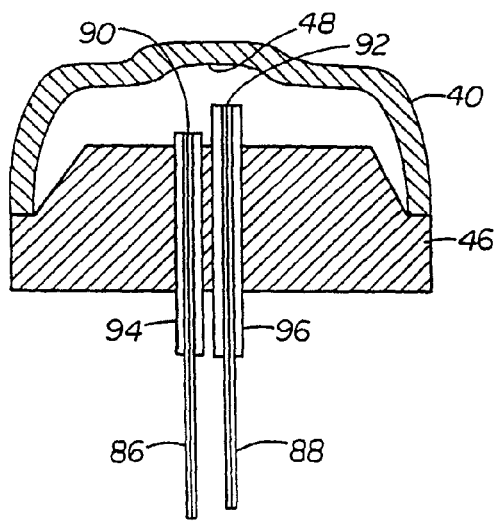
FIG. 11 is a schematic cross-section of the preferred sensor tip incorporating separate dual fiber pairs of differing distances from the diaphragm.

In a temperature non-compensated version of the second design as shown in FIG. 11, both fiber pairs 86 and 88 are located with tips 90 and 92 in optical view of the reflecting surface 48 of the diaphragm 40. In FIG. 11 each pair 86 or 88 is embedded in its own ferrule 94 or 96. The ferrules 94 and 96 are spaced apart so that the tips 90 and 92 are approximately separated by 500 microns.

Figure 12:
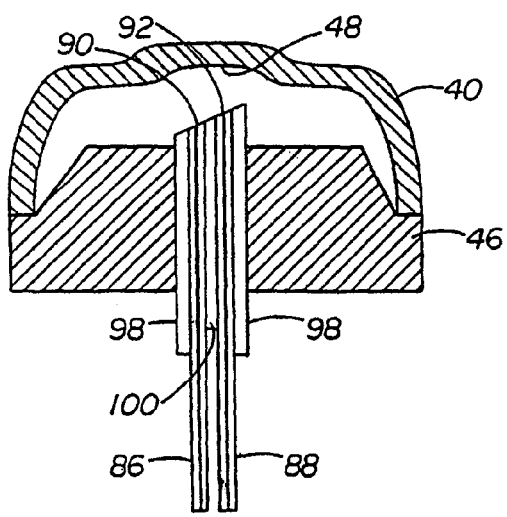
FIG. 12 is a schematic cross-section of the preferred sensor tip with an alternate form of the dual fiber pairs of FIG. 11.

Alternatively, as shown in FIG. 12 both fiber pairs 86 and 88 are embedded in one, larger ferrule 98 and the separation between the tips 90 and 92 is formed by the center of the ferrule 100 and polishing the ferrule tip at an angle to provide a separation distance between the fiber pairs 86 and 88 of approximately 500 microns.

Figure 13:
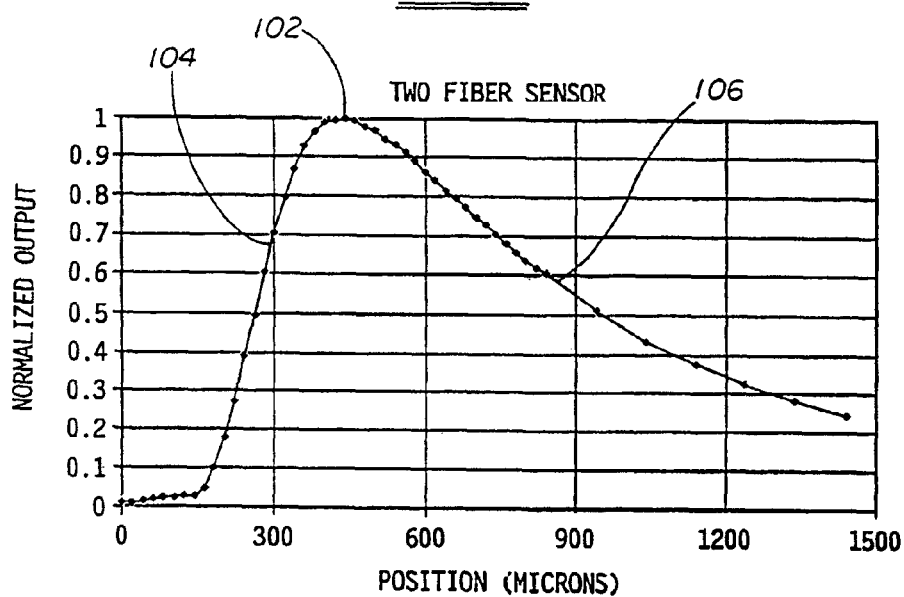
FIG. 13 is a graphical illustration of two fiber output versus distance from the sensor diaphragm.

In both FIG. 11 and FIG. 12, the tip 90 of fiber pair 86 is spaced further from the reflecting surface 48 than the tip 92 of fiber pair 88. With this geometry the sensors of FIG. 11 and FIG. 12 make use of both slopes 104 and 106 of the two fiber sensor response curve of FIG. 13 where one fiber pair operates on the ascending part of the curve while the other fiber pair uses the descending part of the curve.

By appropriately locating the pairs 86 and 88 with the tips 90 and 92 at different distances from the diaphragm 40, the pairs are positioned to straddle the peak intensity 102. The maximum slope or sensor sensitivity occurs if the fiber tip 92 is positioned inside of the peak intensity 102 at about 250 microns. With the fiber pair tip 92 positioned on the first slope 104, the distance between the diaphragm 40 and the fiber pair tip decreases as pressure increases and the sensor output is caused to decrease.

If the second fiber pair tip 90 is positioned on the second slope 106 at approximately 600 microns the sensor output is caused to increase with pressure applied to the diaphragm 40. In what is sometimes called a "push-pull" effect, the sensor output is essentially a ratio of the two outputs from the pairs of fibers 86 and 88 resulting in increased sensor sensitivity to deflection compared to a sensor operated on one slope only with a single fiber optic pair.

Figure 14:
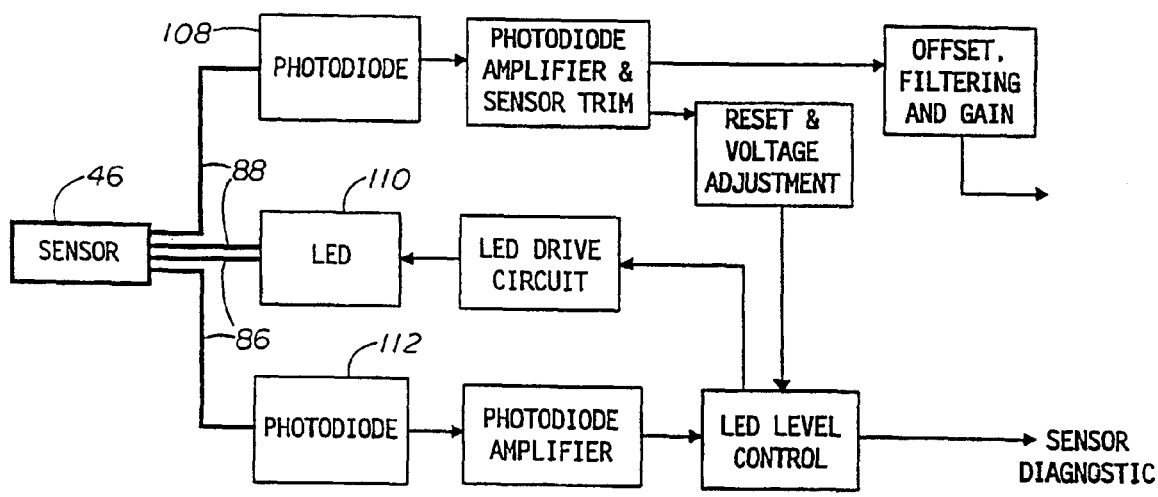
FIG. 14 is a block diagram of the opto-electronic circuitry for the sensor tips of FIGS. 12 and 13.

In the processing scheme of FIG. 14 the light intensity detected by the reference pair tip 90 is maintained at a constant level by changing a LED driving current as illustrated in this block diaphragm. The sensor 46 output is proportioned to the light intensity detected by the measurement detector 108. Similar to the two fiber dynamic sensor above, the LED 110 light intensity is continuously adjusted by changing the current level to keep the reference photodiode 112 output at a constant level. As the light intensity is restored in the reference fiber pair 86, so is the light intensity in the measurement fiber pair 88 thereby compensating for any offset or gain errors of the sensor 46.

Figure 15:
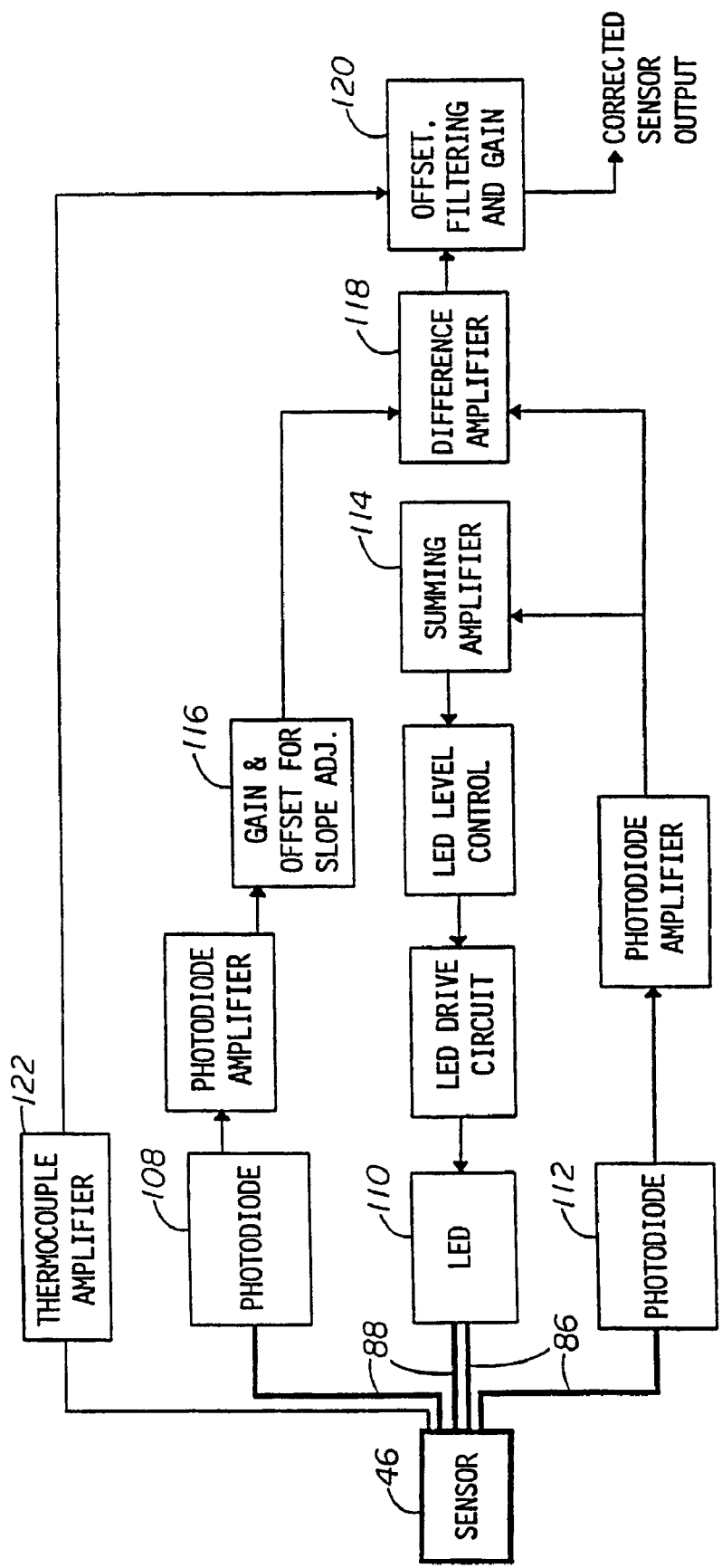
FIG. 15 is a block diagram of alternative sum/difference error correction opto-electronic circuitry for the sensor tips of FIGS. 12 and 13.

Alternatively, as shown in FIG. 15 the LED 110 current level is based on the sum 114 of the measurement detector 108 output and reference detector 112 output. In this configuration the zero relative pressure outputs of the two fiber pairs 86 and 88 are made equal by providing gain 116 to one output and summing 114 to provide current level control to the LED 110. If an environmental condition causes a light intensity change in the fiber pairs 86 and 88, both light intensities decrease or increase in the same direction and approximately the same amount. Thus, this light intensity change is directly corrected by changing the LED 110 light intensity.

By contrast, a relative pressure change applied to the sensor 46 will cause one output to increase and the other output to decrease having a net result of no change in the summing 114 of the outputs. The difference 118 of the two outputs passes through offset, filtering and gain 120 to provide the corrected sensor output. With the use of a sensor 46 also having a thermocouple therein, in addition to the two fiber pairs 86 and 88, correction 122 may be made for the average temperature of the sensor 46 and applied to the offset, filtering and gain 120 of the corrected sensor output.

Figure 16:
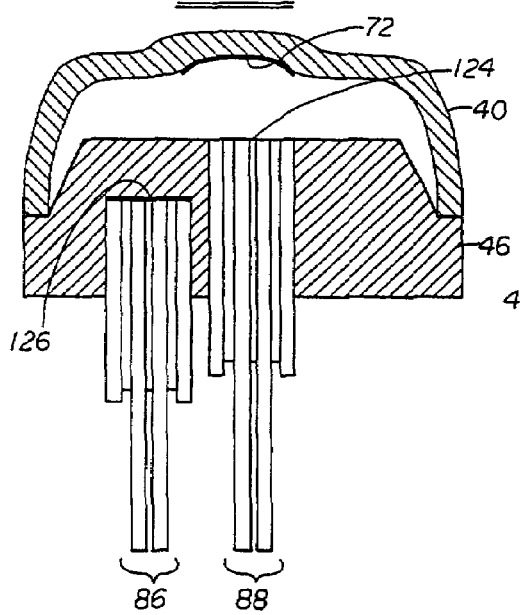
FIG. 16 is a schematic cross-section of the preferred sensor tip having means to compensate for intra-cycle, thermal shock related errors.
Figure 17:
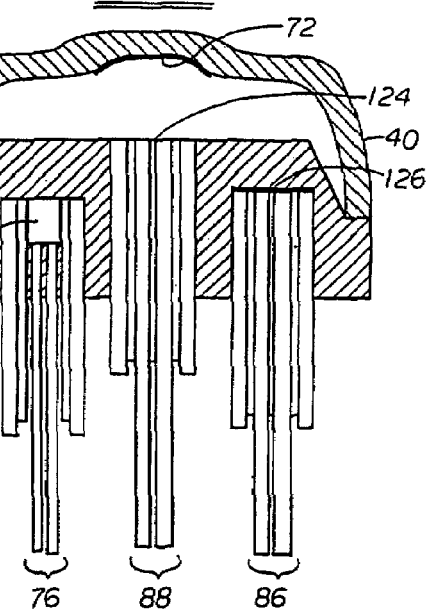
FIG. 17 is a schematic cross-section of the preferred sensor tip further including means for compensation of longer term temperature changes in the sensor tip of FIG. 16.

In FIGS. 16 and 17 two additional versions of temperature-compensated static pressure sensors are described. The version in FIG. 16 is intended to compensate for intra-cycle, thermal shock related errors only. As above, one fiber pair 88 is exposed at its tip 124 for reflection of light off the thin film 72 to measure diaphragm 40 deflection. The other fiber pair 86 or reference pair is terminated by a non-deflecting reflector 126 with the surface covered by a temperature dependent thin film. The processing circuitry may be the same as disclosed in FIG. 14 above with the reference fiber pair 86 connected to photodiode 112. Depending on the application, both temperature dependent thin films 72 and on reflector 126 may be used or only on reflector 126.

In FIG. 17 the sensor 46 incorporates compensation for both short- and long-time constant temperature errors. The sensor 46 incorporates a combination of the temperature dependent reflectivity of the thin film 72 on the diaphragm 40 and the thin film on reflector 126 with the thermocouple temperature probe 74 all inside the sensor with the measurement fiber pair 88. As noted above, the thin films are used to compensate for the short time constant temperature change induced diaphragm deflection errors and the temperature probe is used to compensate for long time constant sensor average temperature errors. While the thin film correction is inherent in the temperature change induced reflectivity changes, the temperature probe correction is achieved through adjustment of the sensor opto-electronic control circuitry gain and offset as illustrated in FIG. 18.

Figure 18:
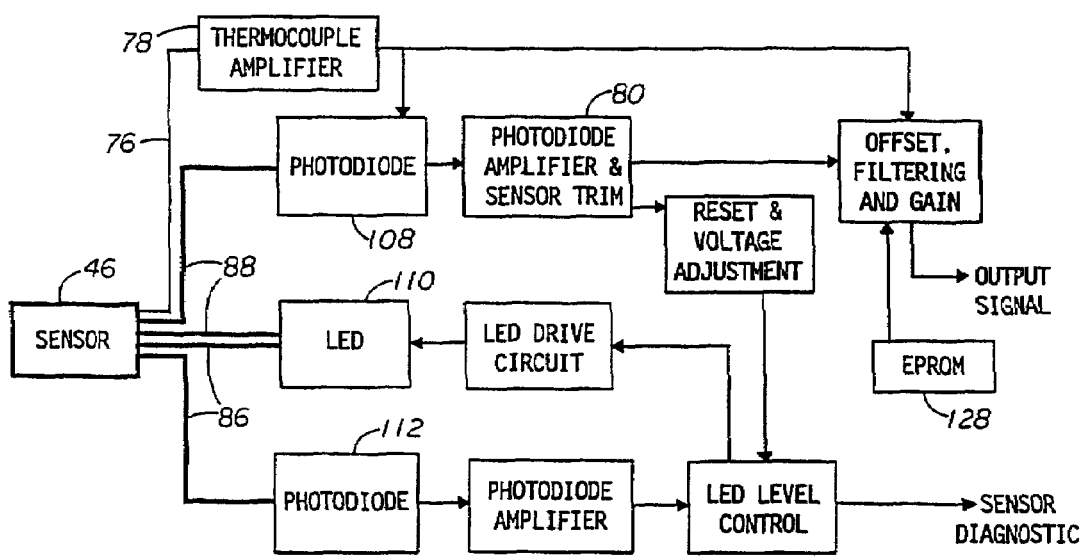
FIG. 18 is a block diagram of the opto-electronic circuitry for the sensor tip of FIG. 17.

The opto-electronic control circuitry of FIG. 18 is similar to the circuitry of FIG. 14, however, the thermocouple amplifier 78 and an Eraseable Programmable Read Only Memory (EPROM) 128 are added. In addition to correcting for short- and long-time constant temperature changes, differing responses among fiber pairs arising from temperature changes can be countered. This non-identical response among fiber pairs may result in both sensor offset and sensor gain errors. The resistance of certain components in the circuitry may be adjusted to calibrate an individual sensor and thereby compensate for the inherent differences among the fiber pairs. Alternatively, the EPROM 128 may be used to store and provide the electronic calibration values.

We claim:

1. A fiber optic pressure sensor comprising a body, at least one pair of optical fibers mounted in the body, said pair of optical fibers terminating at tips, a diaphragm mounted on the body to form an enclosed volume with the body, said diaphragm having an underside facing the volume, and said tips in optical communication with the underside, at least a portion of the underside having a permanently concave curved surface, said curved surface being reflective and juxtaposed to reflect light emitted from the tip of one fiber to the tip of the other fiber, and wherein a thin film is applied to the curved surface to provide the reflectivity, said thin film having a coefficient of reflectivity that decreases with increasing temperature.

2. The sensor of claim 1 wherein the light reflected is maximized when the pressure differential across the diaphragm is a minimum.

3. The sensor of claim 1 wherein movement of the diaphragm toward the tips reduces the light received by the tip of the other fiber.

4. The sensor of claim 1 wherein the curved surface is ellipsoidal.

5. The sensor of claim 1 wherein the curved surface is spherical.

6. The sensor of claim 1 wherein the pair of optical fibers are bonded together along a common interface with each optical fiber comprising a core and a cladding, the cladding being decreased in thickness at the common interface relative to cladding lacking the common interface.

7. The sensor of claim 1 including temperature sensing means mounted in the body.

8. The sensor of claim 1 including a second pair of optical fibers mounted in the body, said second pair of optical fibers terminating at tips, said tips in optical communication with a non-deflecting reflective surface.

9. The sensor of claim 1 including a second pair of optical fibers mounted in the body, said second pair of optical fibers terminating at a second pair of tips, said second pair of tips in optical communication with the volume at a distance from the reflective curved surface different from the tips of the one pair of optical fibers.

10. An internal combustion engine fuel injector having a fuel chamber therein, a fiber optic fuel pressure sensor in the injector, said fiber optic fuel pressure sensor including a diaphragm, the diaphragm being positioned for direct contact with fuel in the fuel chamber.

11. The fuel injector of claim 10 wherein the sensor includes a diaphragm, the diaphragm being in communication with the fuel chamber.

12. An internal combustion engine fuel injector having a fuel chamber therein, a channel formed in the fuel-injector separate from the fuel chamber, said channel open to an engine combustion chamber upon installation of the injector and a fiber optic combustion pressure sensor in said channel.

13. The fuel injector of claim 12 wherein the combustion pressure sensor includes a diaphragm, the diaphragm being in communication with the channel and combustion chamber.

14. The fuel injector of claim 10 including a channel formed in the injector, said channel open to an engine combustion chamber upon installation of the injector and a fiber optic combustion pressure sensor in said channel.

15. An internal combustion engine fuel injector having a fuel chamber therein, a fiber optic fuel pressure sensor in the injector, said fiber optic fuel pressure sensor in communication with the fuel chamber, a channel formed in the injector, said channel open to an engine combustion chamber upon installation of the injector and a fiber optic combustion pressure sensor in said channel,
- temperature sensing means mounted in at least one pressure sensor,
- circuit means in opto-electronic communication with the sensor having the temperature sensing means therein, said circuit means including means to inject light into the at least one pressure sensor, means to detect light arriving from the at least one pressure sensor and provide a response thereto and means to detect and respond to temperature induced changes in the temperature sensing means,
- means to combine the responses to the light detected and temperature induced changes and in response thereto to provide an output corrected for the temperature induced changes.

16. The fuel injector of claim 15 wherein said circuit means in response to the output corrected for temperature induced changes adjusts the means to inject light into the at least one pressure sensor.

17. The fuel injector of claim 10 including circuit means in opto-electronic communication with at least one pressure sensor, said circuit means including means to inject light into the at least one pressure sensor, means to detect light arriving from the at least one pressure sensor and provide a response thereto,
- and means actuated by an external trigger to adjust the means to inject light into the at least one pressure sensor.

18. The fuel injector of claim 12 including circuit means in opto-electronic communication with at least one pressure sensor, said circuit means including means to inject light into the at least one pressure sensor, means to detect light arriving from the at least one pressure sensor and provide a response thereto,
- and means actuated by an external trigger to adjust the means to inject light into the at least one pressure sensor.

19. The fuel injector of claim 14 including circuit means in opto-electronic communication with at least one pressure sensor, said circuit means including means to inject light into the at least one pressure sensor, means to detect light arriving from the at least one pressure sensor and provide a response thereto,
- and means actuated by an external trigger to adjust the means to inject light into the at least one pressure sensor.

20. An internal combustion engine fuel injector having a fuel chamber therein, a fiber optic fuel pressure sensor in the injector, said fiber optic fuel pressure sensor in communication with the fuel chamber, a channel formed in the injector, said channel open to an engine combustion chamber upon installation of the injector and a fiber optic combustion pressure sensor in said channel,
- wherein at least one pressure sensor includes two pairs of optical fibers and a diaphragm, both said pair of optical fibers having tips in optical reflective communication with the diaphragm,
- the tip of one pair of optical fibers spaced from the diaphragm at a distance different from the tip of the other pair of optical fibers.

21. The fuel injector of claim 20 wherein each pair of optical fibers is mounted in a separate ferrule.

22. The fuel injector of claim 20 wherein both pairs of optical fibers are mounted in the same ferrule.

23. The fuel injector of claim 20 wherein the diaphragm has an underside, at least a portion of the underside comprising a reflective surface, whereby movement of the diaphragm nearer to both tips causes the light output of the nearest tip to the diaphragm to decrease and the light output of the furthest tip to increase.

24. The fuel injector of claim 23 including circuit means in opto-electronic communication with the at least one pressure sensor having two pairs of optical fibers, said circuit means including means to inject light into one fiber of each pair of optical fibers, means to detect light arriving from the other fiber of each pair of optical fibers and provide responses thereto,
- whereby the response corresponding to the tip furthest from the diaphragm is caused to adjust the means to inject light into one fiber of each pair of optical fibers and the response corresponding to the tip nearest the diaphragm provides an output corrected by the response of the tip furthest from the diaphragm.

25. The fuel injector of claim 24 wherein the means to inject light is adjusted to provide a substantially constant response from the tip furthest from the diaphragm.

26. The fuel injector of claim 23 including circuit means in opto-electronic communication with the at least one pressure sensor having two pairs of optical fibers, said circuit means including means to inject light into one fiber of each pair of optical fibers, means to detect light arriving from the other fiber of each pair of optical fibers and provide responses thereto, summing means to combine the responses and adjust the means to inject light into one fiber of each pair of optical fibers and differencing means to combine the responses to provide a corrected output.

27. The fuel injector of claim 26 including temperature sensing means mounted in the at least one pressure sensor,
- and means in said circuit means adapted to respond to temperature induced changes in the temperature sensing means and in response thereto to adjust the corrected output.

28. The fuel injector of claim 24 including means to programmably calibrate the responses among a plurality of optical fiber pairs.

* * * * *